United States Patent [19]

Kowalik et al.

[11] Patent Number: 5,017,051
[45] Date of Patent: May 21, 1991

[54] ELECTROHYDRAULIC CONTROL MEANS FOR HYDRAULIC SELF-ADVANCING SUPPORT UNITS

[75] Inventors: Heinrich Kowalik; Peter Pletsch, both of Wuppertal; Gerald Kohl, Erkrath, all of Fed. Rep. of Germany

[73] Assignee: Hermann Hemscheidt Maschinenfabrik GmbH & Co., Wuppertal, Fed. Rep. of Germany

[21] Appl. No.: 422,539

[22] Filed: Oct. 17, 1989

[30] Foreign Application Priority Data

Oct. 20, 1988 [DE] Fed. Rep. of Germany ....... 3835755

[51] Int. Cl.$^5$ .............................................. E21D 23/12
[52] U.S. Cl. ......................................... 405/302; 299/1
[58] Field of Search .................. 405/302; 91/170 MP; 299/1, 33; 364/131, 132, 188

[56] References Cited

U.S. PATENT DOCUMENTS

| 3,320,001 | 5/1967 | Allen et al. ................... 405/302 X |
| 4,228,508 | 10/1980 | Benthaus ............................. 299/1 X |
| 4,518,285 | 5/1985 | Weber et al. ..................... 405/302 |
| 4,870,697 | 9/1989 | Weber ............................... 299/1 X |

FOREIGN PATENT DOCUMENTS

| 400709 | 1/1974 | U.S.S.R. ............................. 405/302 |
| 914768 | 3/1982 | U.S.S.R. ............................. 405/302 |
| 2116240 | 9/1983 | United Kingdom ............... 405/302 |

Primary Examiner—Randolph A. Reese
Assistant Examiner—John Ricci
Attorney, Agent, or Firm—Berman, Aisenberg & Platt

[57] ABSTRACT

A control means for hydraulic self-advancing support units for underground working, comprising at least one electrohydraulic control device comprising an electric circuit for energizing electromagnets which actuate hydraulic valves, a command keyboard connected to the energizing circuit, a display connected to the energizing circuit and two multipole connectors for connecting the control device to respective adjacent devices, the multipole connectors being connected to one another and to the energizing circuit by electric lines inside the control device, characterized in that the energizing circuit is substantially made up of a CPU control sub-assembly, a keyboard and display sub-assembly, and a magnet control sub-assembly, these sub-assemblies being interconnected by a common bus line, the line connection between the plug-in connectors comprises at least one flexible printed circuit board connected by at least one ribbon cross-connection to one of the three sub-assemblies, and the magnet control sub-assembly is connected by electric lines to the electromagnets, which are disposed outside the control device and are incorporated in the hydraulic valves.

36 Claims, 8 Drawing Sheets

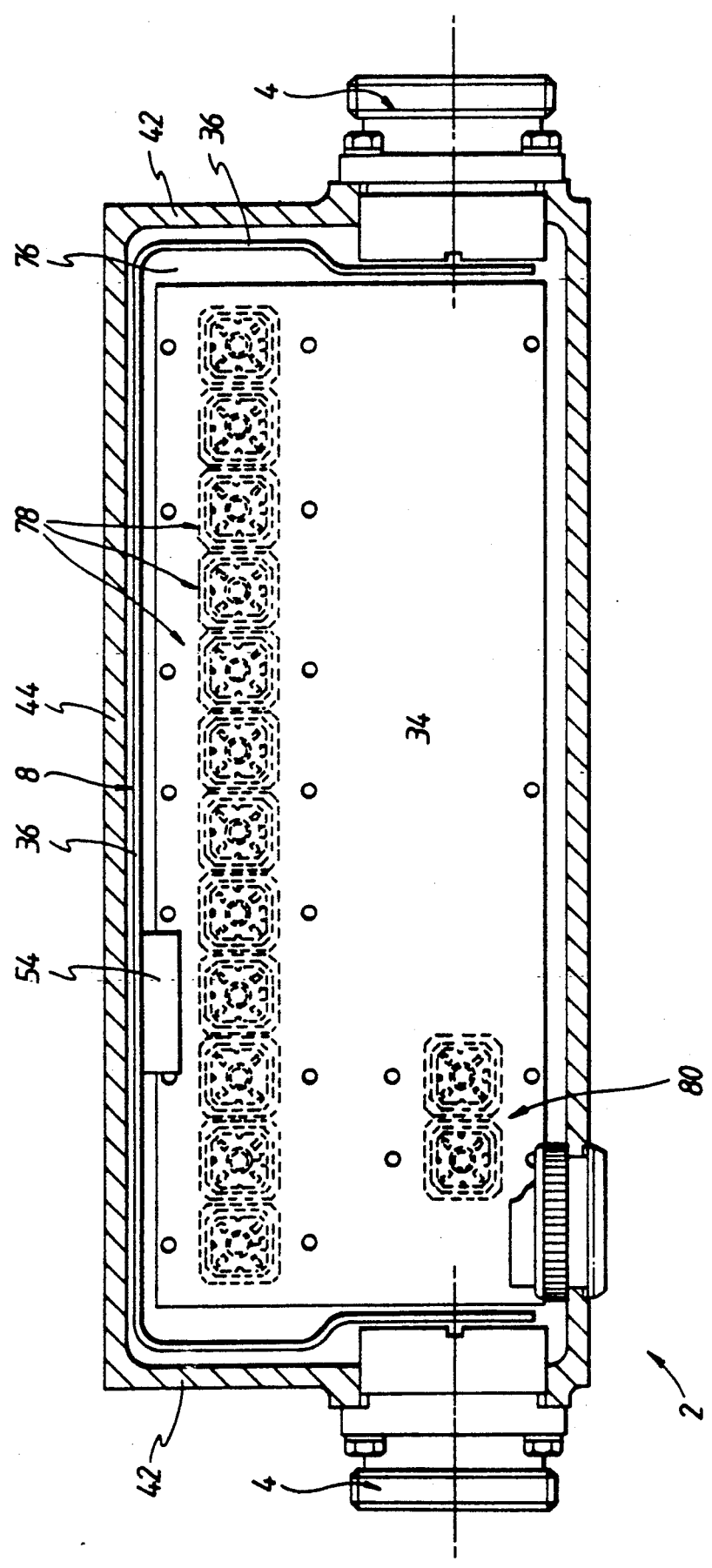

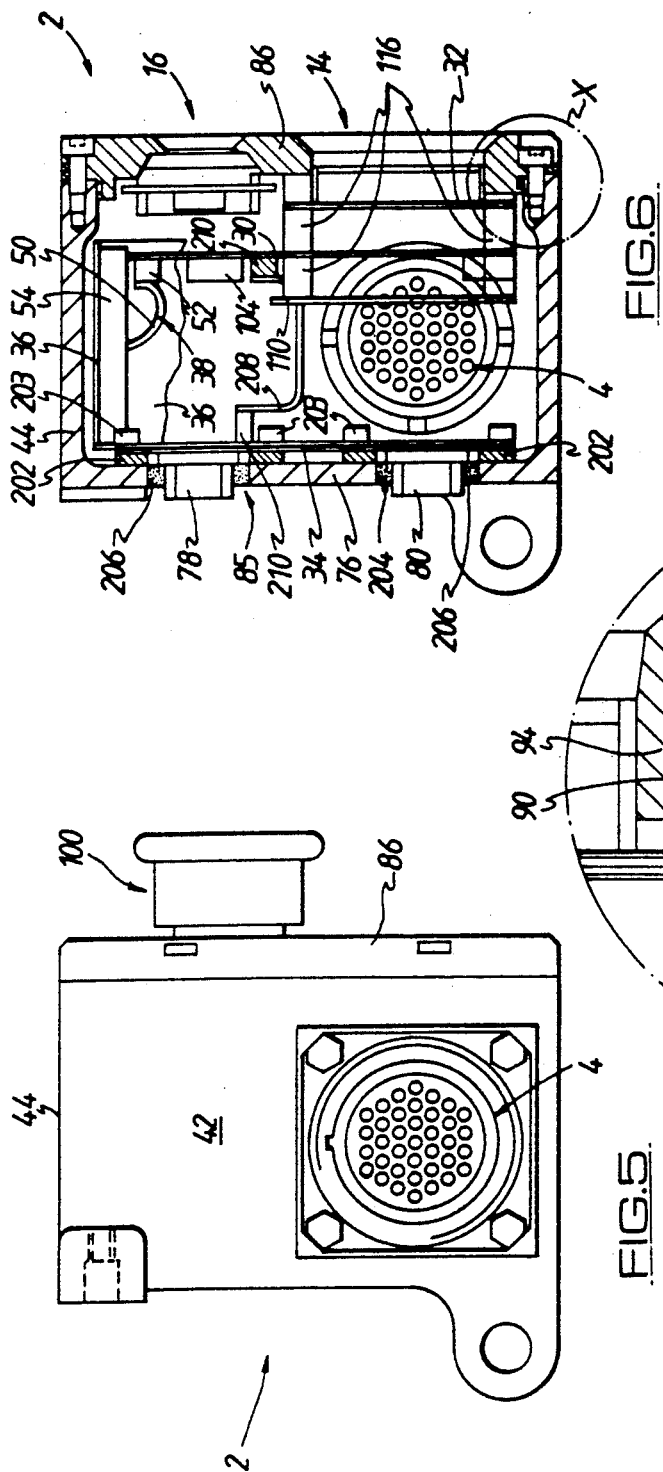

ELECTROHYDRAULIC CONTROL MEANS FOR HYDRAULIC SELF-ADVANCING SUPPORT UNITS

The invention relates to a control means for hydraulic self-advancing support units for underground working, comprising at least one electrohydraulic control device comprising an electric circuit for energising electromagnets which actuate hydraulic valves, a command keyboard connected to the energising circuit, a display connected to the energising circuit and two multipole connectors for connecting the control device to respective adjacent devices, the multipole connectors being connected to one another and to the energising circuit by electric lines inside the control device.

In underground face supports, it is conventional to use a number of adjacent hydraulic self-advancing support units, or "shield-type" support frames.

Each self-advancing support unit has a control device for energising electromagnets which actuate hydraulic valves, the control device being electrically connected to the control devices of the adjacent support units so as to form a control system which is connected to an above-ground central device, usually via a collective device or "parameter station". This method can be used inter alia for "neighbour control" of the support units or for selective actuating of some support units by the central device.

The known control devices are in need of improvement with regard to their construction and circuitry, since on the one hand all internal connections comprise lines made up into cable harnesses, thus disadvantageously greatly increasing the cost of manufacture and assembly and test work. On the other had the known control devices are also difficult to operate. Furthermore the electromagnets are usually disposed inside the control device, and act mechanically on the valves, which are disposed externally and where the control device is permanently mounted. This is a critical disadvantage, since, when a device is replaced, laborious adjustment is needed to ensure that the hydraulic valves are accurately connected.

The object of the invention, starting from the aforementioned prior art, is to simplify the construction and circuitry of the control devices in the control means according to the preamble, and improve them so that devices can be easily and rapidly replaced, and also so that the control devices are simple and easy to operate.

To this end according to the invention the energising circuit is substantially made up of a CPU control sub-assembly, a keyboard and display sub-assembly, and a magnet control sub-assembly, theses sub-assemblies being interconnected by a common bus line, the line connection between the plug-in connectors comprises at least one flexible printed circuit board connected by at least one ribbon transverse connection to one of the three sub-assemblies, and the magnet control sub-assembly is connected by electric lines to the electromagnets, which are disposed outside the control device and are incorporated in the hydraulic valves.

The manufacturing and testing costs can be suitably reduced according to the invention, by the consistent replacement of the previously-used individual lines, made up into cable harnesses, by flexible circuit boards and ribbon connections. The division into sub-assemblies according to the invention and the connection between them via the bus line also simplifies and reduces the cost of manufacture. As a result, the sub-assemblies can easily and quickly be interconnected via multipole connectors, e.g. a 20-pole ribbon cable in each case. All sub-assemblies are connected exclusively via the bus line, and data traffic between individual sub-assemblies and between adjacent control units is controlled and monitored by the CPU control sub-assembly.

In an advantageous embodiment of the invention the control sub-assembly is equipped with a single-chip microprocessor having very high integration density, thus advantageously increasing the reliability as compared with the known control system and further reducing the cost of components and assembly. Furthermore, the control system is extremely compact owing to the microprocessor provided according to the invention, in which the circuitry is internal instead of external owing to the higher integration density, and can be used for all the operating functions of an electrohydraulic face-support control system, which can also be modified as required by the customer, thus ensuring comfortable operation.

Since the electromagnets are disposed above the control device and are connected exclusively via electric lines to the control device, i.e. to the magnet-control sub-assembly, the control devices can be easily and quickly replaced, without requiring adjustment of mechanical connections.

Other advantageous features of the invention are contained in the sub-claims and the following description.

The invention will now be explained in detail with reference to an embodiment shown in the drawings, in which:

FIG. 4 is a section through the control device according to the invention, along IV—IV in FIG. 3;

FIG. 5 is a side view of the control device in the direction of the arrow V in FIG. 2;

FIG. 6 is a section along line VI—VI in FIG. 2;

FIG. 7 is a larger-scale diagram of the detail X in FIG. 6;

In the various drawings, like parts are denoted by like reference numbers.

Figure 1:
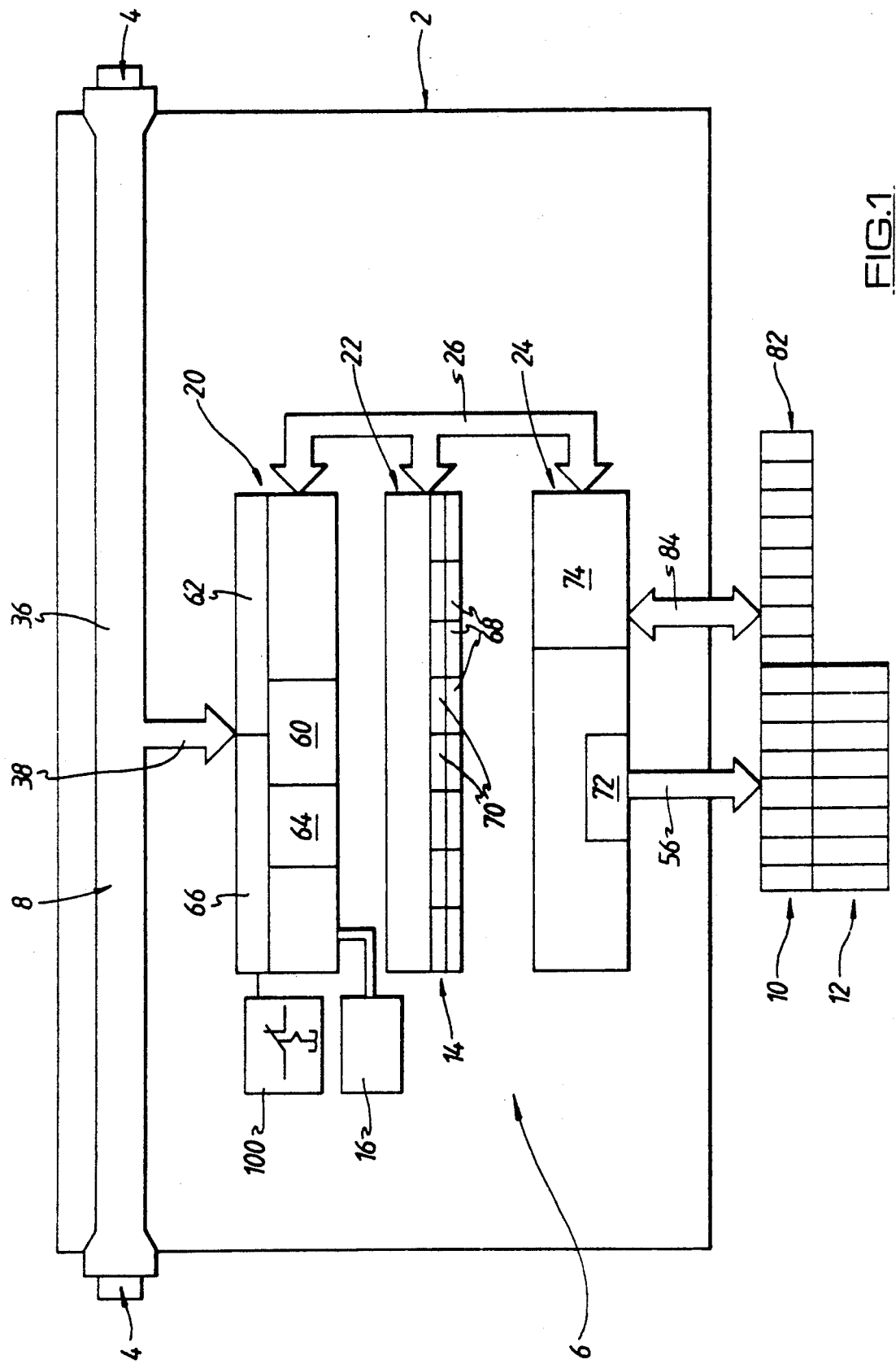
FIG. 1 is a simplified block circuit diagram of a control means according to the invention.

FIG. 1 is a block circuit diagram of a control means according to the invention, showing only one control device 2, but usually a number of control devices 2, i.e. one for each support unit, are electrically connected in series in a control circuit. To this end the control device 2 has two multipole connectors 4 (see also FIGS. 2 to 6)

for connecting to cables (not shown). The connectors 4, which can be plugs or sockets, are connected to one another and to an electric energising circuit 6 via electric line connections 8 inside the control unit 2. The energising circuit 6 is for electrically energising electromagnets 10, which in turn cooperate mechanically with corresponding hydraulic valves 12 for performing various hydraulic functions of the support, such as jigging, removal of timber, advancing and the like.

Figure 2:
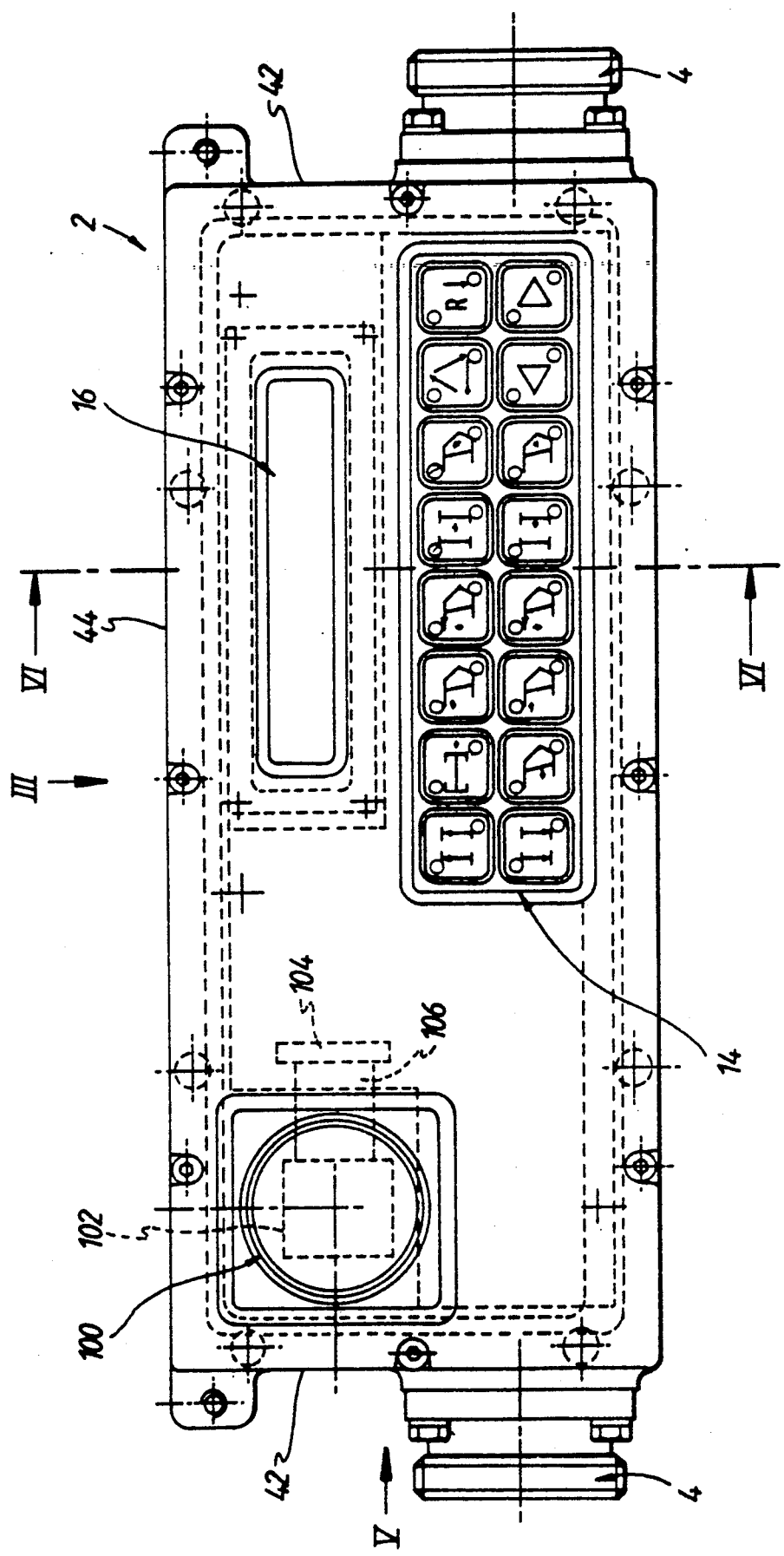
FIG. 2 is a front view of a control device according to the invention.

As shown more particularly in FIG. 2, the control device 2 also has a command keyboard 14 electrically connected to the energising circuit 6, and a display 16 also electrically connected to the energising circuit 6 and preferably being an LCD optical-character display.

As FIG. 1 shows, the energising circuit 6 is divided according to the invention substantially into three sub-assemblies, i.e. a CPU control sub-assembly 20, a keyboard and display sub-assembly 22 and a magnet control sub-assembly 24, the three sub-assemblies advantageously being interconnected via a common bus line 26, (port-bus). The sub-assemblies 20, 22, 24 are connected exclusively via the bus line 26, and the CPU control sub-assembly 20 generates all data and control signals required by the other sub-assemblies 22, 24 and controls and monitors the data traffic between neighbouring control devices. According to the invention, each of the three sub-assemblies 20, 22 24 is formed on a separate printed circuit board, i.e. on a CPU control circuit board 30 (see FIGS. 3 and 6), a keyboard and display circuit board 32 (see also FIGS. 3 and 6) and a magnet control circuit board 34 (see FIGS. 3, 4 and 6).

Also according to the invention, the line connection 8 between the connectors 4 (FIG. 1) is in the form of at least one flexible circuit board 36 in strip form, shown more particularly in FIG. 4, and connected via a ribbon cross-connection 38 (see FIGS. 1 and 6) to one of the three sub-assemblies, preferably the CPU control sub-assembly 20 or the control circuit board 30. It is also particularly advantageous if the connection between the two multipole connectors 4 comprises not one but a number of parallel flexible circuit boards 36 in strip form. The use of a number (e.g. two or more particularly three) of flexible circuit boards 36 reduces the resistance (i.e. increases the conductivity) and therefore reduces the voltage drop at the flexible circuit boards 36, thus advantageously increasing the reliability of data transmission. Advantageously one of the flexible circuit boards 36 has an number of tracks for transmitting data signals and for voltage supply. The circuit board 36 is then connected via the ribbon cross-connection 38 to the control circuit board 30 (see also FIG. 8).

The other two flexible circuit boards 36 each have only two conductive layers and are thus used for low-loss voltage transmission to the next control unit. Corresponding connections between the respective boards 36 are formed by soldering tabs on the connectors 4. Further details about the connectors 4 will be explained hereinafter.

As FIG. 4 shows, the connectors 4 are disposed in a respective one out of two facing side walls 42 of the casing of the control unit 2, and the flexible circuit board or boards 36 extend in very space-saving manner along and parallel to the side walls 42 and a top wall 44 of the casing.

Figure 3:
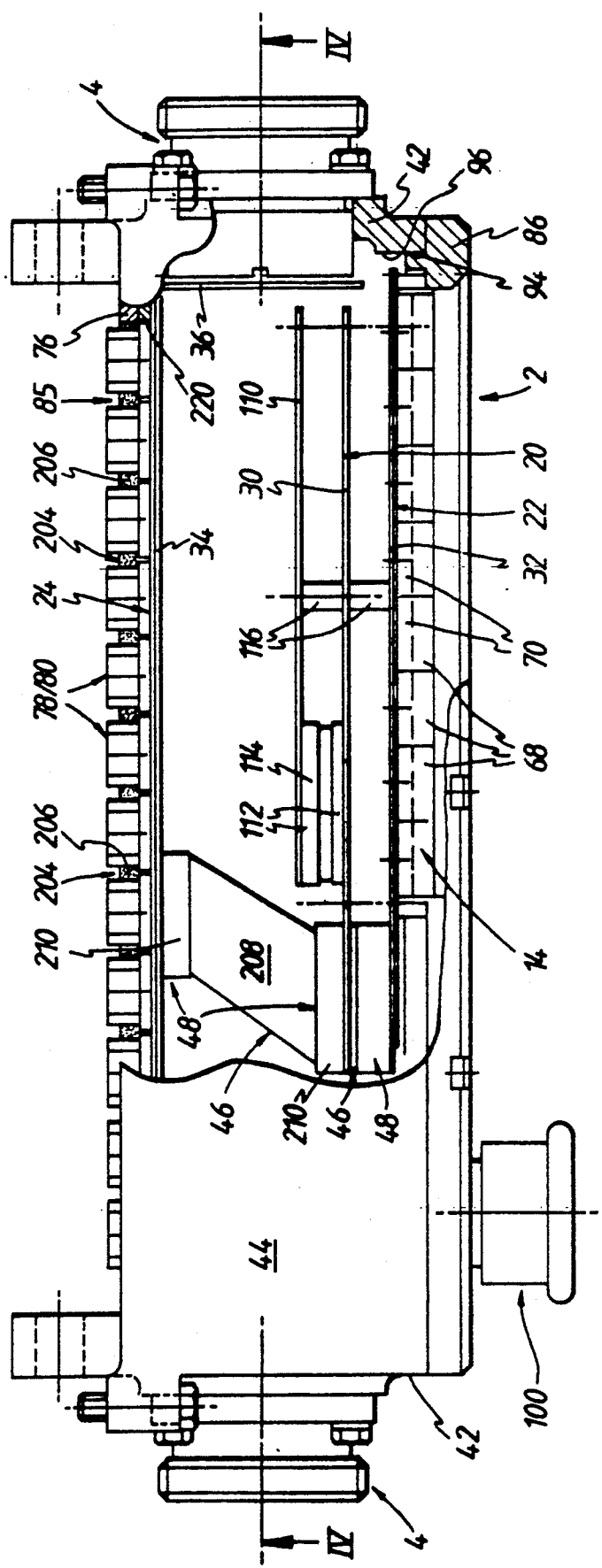
FIG. 3 is a partly cut-away plan view of the control device in the direction of arrow III in FIG. 2.

According to the invention the bus line 26 connecting the three sub-assemblies 20, 22, 24 or the three circuit boards 30, 32, 34 is made up of one or more e.g. 20-pole ribbon cables 46, each connected via connectors 48 to the sub-assemblies 20, 22, 24 or the circuit boards 30, 32, 34 as clearly shown in FIG. 3.

As shown in FIG. 6, the ribbon cross-section 38 according to the invention likewise comprises a ribbon cable 50 connected at one end via a connector 52 to the CPU control sub-assembly 20 or the control circuit board 30 and at the other end via a plug 54 to at least one of the flexible circuit boards 36 in the region between the connectors 4, to which end the plug 54 has contact pins which in conventional manner are soldered to the tracks on the flexible circuit board 36.

All the plugs connected by ribbon cables are preferably "self-contacting" plugs, i.e. they have contact elements which can penetrate through the insulation of the ribbon cable, e.g. by clamp-cutting technology, and thus make contact with the individual conductors in the ribbon cable. This construction according to the invention is an important contribution towards simple and economic assembly of the control unit according to the invention.

According to another essential feature of the invention, the magnet control sub-assembly 24 is connected by electric line connections 56 (shown diagrammatically only in FIG. 1) to the electromagnets 10, which according to the invention are disposed above the control device 2 and, in the present case, are incorporated with the hydraulic valves 12 disposed in a "hydraulic block". As a result of this advantageous configuration, the control device 2 can easily and quickly be replaced, since there is no need for time-consuming adjustments of the mechanical connections between the electromagnets 10 and the hydraulic valves 12, but it is only necessary to change over the connections 56.

As also shown in FIG. 1, the CPU control sub-assembly 20 according to the invention comprises a "single-chip" microprocessor 60, i.e. of type 80 C451, thus advantageously greatly reducing the cost of additional external circuitry and wiring for the components. Microprocessor 60 is the core of the control sub-assembly 20 and contains all the operating functions of an electro-hydraulic face-support control system, in very compact manner. The CPU control sub-assembly 20 also comprises a data-transmitting component 62 (DUART), at least one data store 64 and/or a device-protecting voltage-regulating circuit 66. The data store 64 can comprise an E-PROM store and a RAM store each with 32 K.

As also diagrammatically shown in FIG. 1, the keyboard and display sub-assembly 22 carries a command keyboard 14, comprising command keys 68 and LED indicator lamps 70 disposed inside them (see also FIG. 3).

As also diagrammatically shown in FIG. 1, the magnet control sub-assembly 24 comprises a circuit 72 for energising and lowering the electromagnets 10 and a limit switch or sensor interrogating circuit 74. The energising and lowering circuit 72 energises the electromagnets 10 in known manner with high power, after which the power is reduced to a minimum holding power, thus greatly reducing the energy consumption.

As shown in FIGS. 3 and 6, the magnet control sub-assembly 24 or the corresponding circuit board 34 are secured to a rear wall 76 of the casing of the control device 2, and has connector parts 78 for connecting the line connections 56 leading to the electromagnets 10 (see FIG. 1) and also has connector parts 80 for connecting to lines 84 leading to limit switches 82 and/or other state sensors (see also FIG. 1). The connector parts 78, 80 extend through openings 85 in the casing wall 76 outwards (lead-throughs). The particularly advantageous arrangement, as compared with known control units, of the connector parts 78, 80 on the circuit board 34 and the method of securing and sealing them will be explained in detail hereinafter.

The limit switches 82 or state sensors detect various quantities such as the pressure, position of the hydraulic cylinders and the like, and transmit them to the interrogating circuit 74 of the magnet control sub-assembly 24.

As shown more particularly in FIGS. 3 and 6, the CPU control sub-assembly 20 and the keyboard and display sub-assembly 22 or the corresponding circuit boards 30, 32 are secured to a front plate 86 of the casing of the control unit 2. The front plate 86 preferably constitutes a cover and is sealed by a seal 88 from the casing of the control unit 2, the seal 88 being disposed in a peripheral groove 90 in a cover attachment 94 inserted with slight clearance into a front opening 92 in the casing and disposed so as to abut in sealing-tight manner against the inner surface 96 of the casing (see particularly FIGS. 3, 6 and 7). Additionally or alternatively to the seal 88, the seal between the control-unit casing and the front plate 16 can be made by using a sealing compound, more particularly silicone.

Advantageously the display 16, which is an optical-character LCD display and is connected to the CPU control sub-assembly 20 as shown in FIG. 1, is also disposed on the front plate 86 of the control device 2 and is adapted to display operating instructions in optical characters and also error messages in the event of a fault, thus advantageously improving the comfort of operation and widening the possibilities of application. A holding key 100 together with a holding-key circuit board 102 is also secured to the front plate 86 and is likewise connected to the CPU control sub-assembly 20, i.e. via the device-protecting voltage-regulating circuit 66, by a ribbon cable 106 provided with "self-contacting" multipole connectors 104 (see particularly FIGS. 1 and 2). The holding key 100 is relevant as regards safety, since it switches on the magnets via the hardware in the actuated device and prevents actuation of the control device by neighbouring units.

According to another feature of the invention, a sub-assembly for certain additional functions such as parameterisation, connection to the mains, remote charging, interface, transmitter bus and the like is provided in addition to the three sub-assemblies 20, 22 and 24. The additional sub-assembly is likewise formed on a separate circuit board 110, also secured to the front plate 86, and is connected by self-contacting connectors 112 and an additional ribbon cable 114 to the CPU control sub-assembly 20 and/or the control circuit board 30, as best shown in FIG. 3. Alternatively the additional circuit board 110 can be plugged into the control circuit board 30 directly via the connectors 112, i.e. without a ribbon cable 114.

As shown in FIGS. 3 and 6, all the circuit boards 32, 30 and 110 held on the front plate 86 can be secured parallel to one another via spacers 116.

The construction of the multipole connector 4 according to the invention will now be explained with reference to FIGS. 8 to 11.

A connector 4 according to the invention comprises a contact holder 112 secured via securing parts (explained hereinafter) in sealing-tight manner in an opening in the wall 42 of the casing of the control device 2 (see FIG. 11) in the form of a hermetically sealed lead-through.

When used for the aforementioned purpose in underground working, it is essential for the connector 4 according to the invention to be sealing-tight, since it is always necessary underground to work in an intrinsically safe region protected from explosion. The contact holder 120 has a number (37 in the embodiment) of contact chambers extending in the direction of the longitudinal axis 122 (FIG. 9) of the connector and parallel to one another through the contact holder 120 and each containing contacts elements 126 which are peripherally sealed from the contact chambers 124, so that connecting pieces 128 of elements 126 project outwardly from one side of the contact-holder 120. In the embodiment shown, the contact elements 126 are elongate socket contacts of substantially cylindrical cross-section, but corresponding plug pins can likewise be used according to the invention. A corresponding multipole plug (not shown) therefore will have either pins or sockets.

Figure 8:
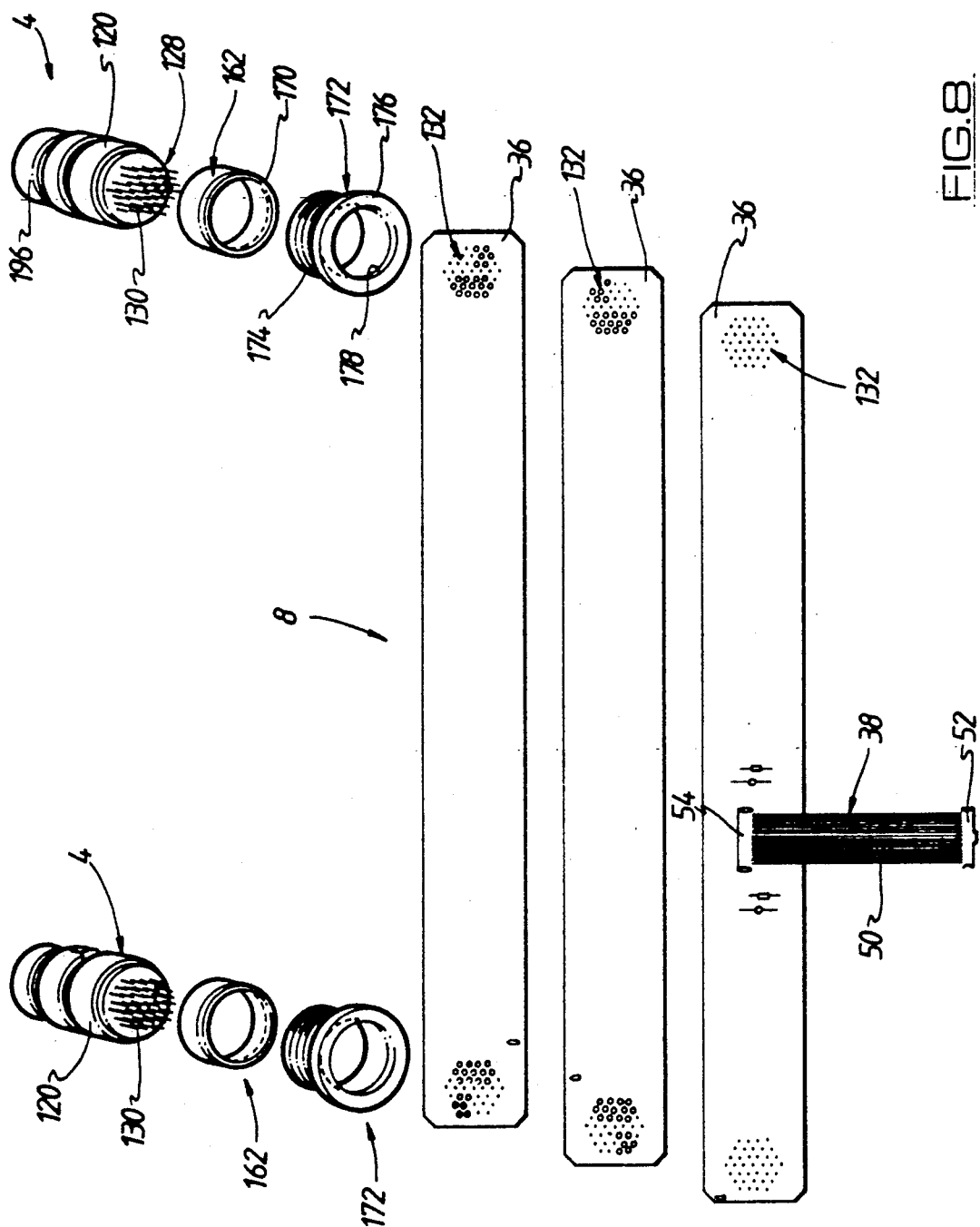
FIG. 8 is an exploded view of the two multipole connectors and the line connection, comprising three flexible circuit boards, for the control device according to the invention.

According to the invention the connecting pieces 128 of the contact elements 126 are in the form of parallel soldering tabs 130, or "soldering legs". By this means the connector 4 according to the invention can be connected in a single operation inside the device, in that, as shown in FIG. 8, the soldering pins 130 are inserted into openings 132 in one or more of the flexible circuit boards 36 and are then soldered in a single operation, more particularly in known manner in a soldering bath. A number of circuit boards 36 are then successively mounted and soldered. In the process, various connections between the circuit boards 36 can be made via the soldering tabs 130 according to the invention, at the soldered joints.

Figures 9, 9A:
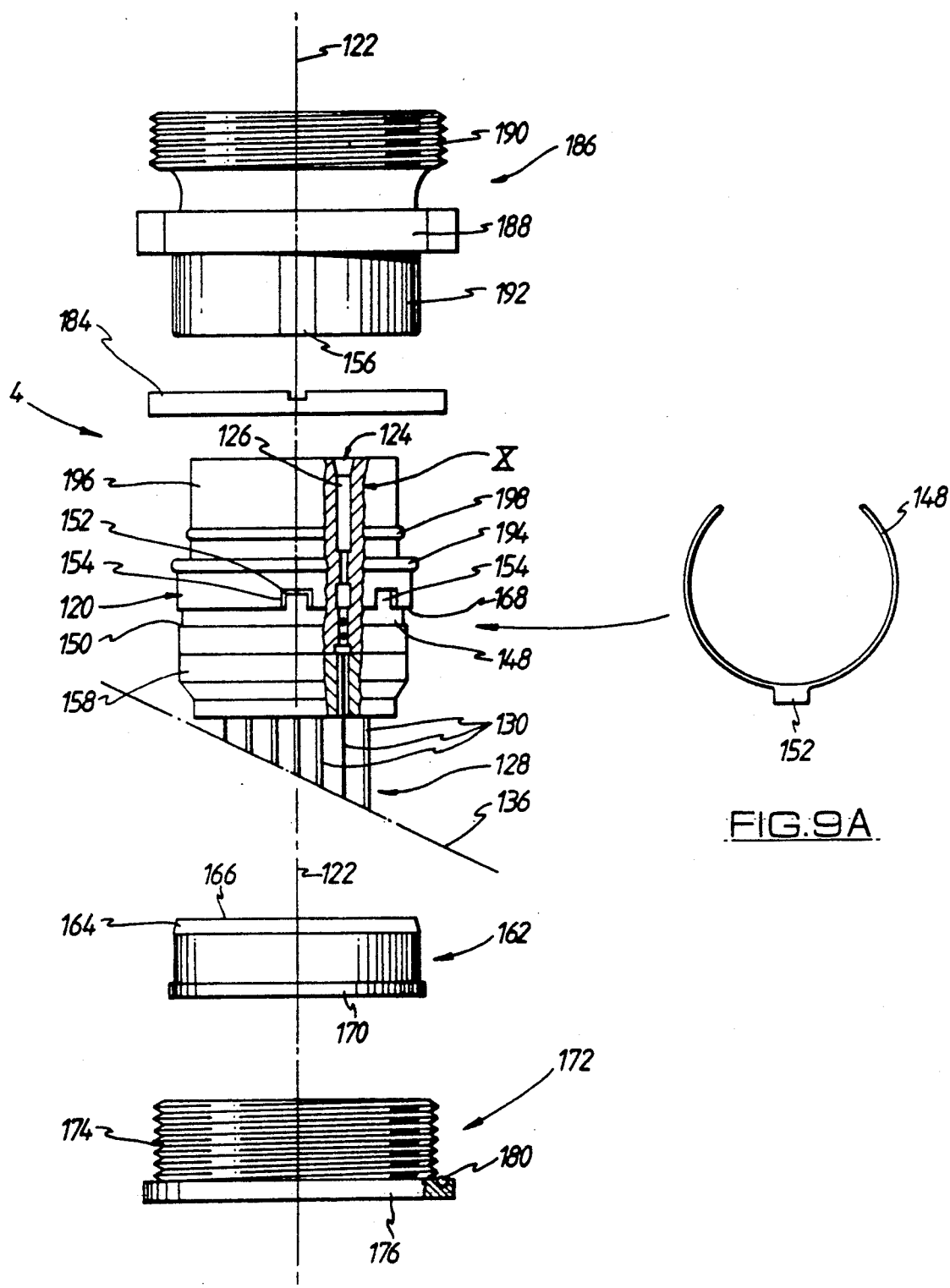
FIG. 9 is a larger-scale side view of one of the multipole connectors in FIG. 8, together with securing parts.
FIG. 9A is a plan view of a slotted clamping ring utilized with the multiple connector shown in FIG. 9.

In FIGS. 8 and 9, the soldering tabs 130 according to the invention project for various lengths beyond the contact holder 120. As shown in FIG. 9, the free ends of the soldering tabs 130 lie on a plane 136 situated at an angle to the longitudinal axis 122 of the connector. This greatly simplifies insertion of the soldering tabs 130 into the corresponding openings 132 in the circuit board 36.

Figure 10:
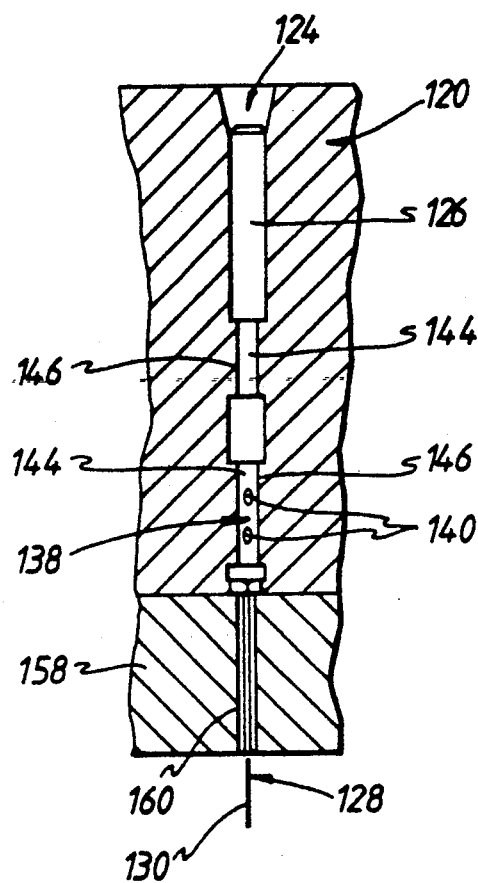
FIG. 10 is a larger-scale representation of the region X shown in section in FIG. 9.

As shown particularly in FIG. 10, the soldering tabs 130 preferably comprise wires of circular cross-section and crimped to the contact elements 126. The wires are inserted into a sleeve-like crimping region 138 of the respective contact element 126 and are crimped in electrically conductive manner by embossing at 140.

Figure 11:
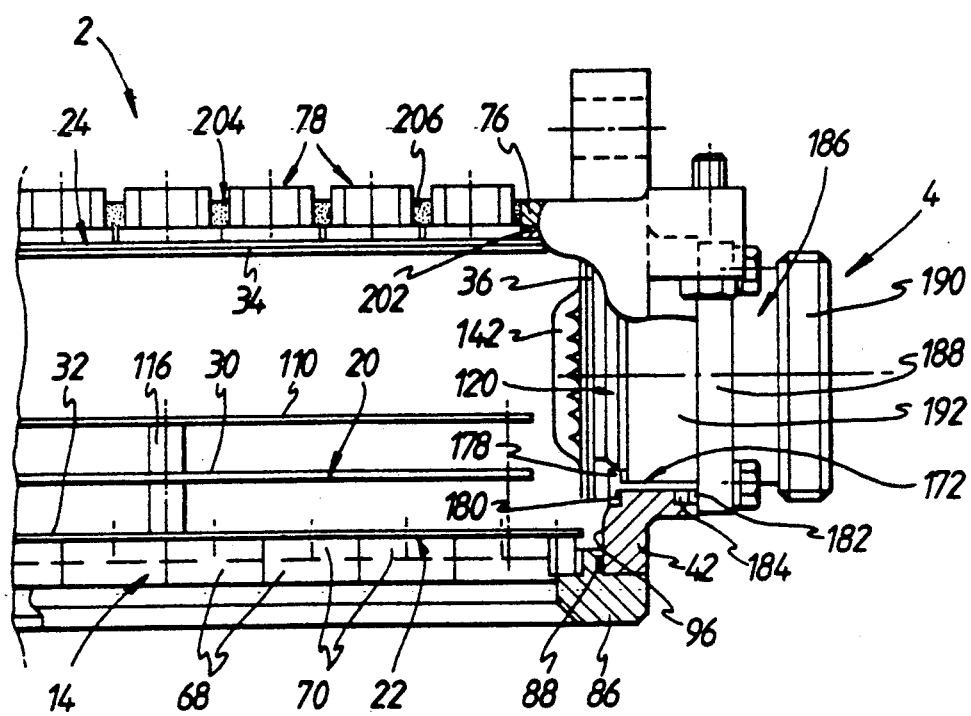
FIG. 11 shows the multipole connector in FIGS. 8 to 10 in its assembly position in the control device according to the invention (as a variant of FIGS. 3 and 4).

After soldering, the tabs 130 are cut off in conventional manner immediately above the soldered joint, as shown in FIG. 11. Advantageously also the entire soldered connecting region of the circuit board or boards 36 is covered by an insulating protective layer 142.

As shown more particularly from the sectional drawing in FIG. 10, each contact element 126 is peripherally sealed from the contact holder 120 or from the contact chamber 124 and is non-positively and/or positively held in the contact chamber 124, in that the contact holder 120 is made of a resilient material, preferably rubber, and the contact element 126 has at least one constriction 144 engaging an annular web 146 formed in the contact chamber 124. In the example shown, the contact element 126 has two axially spaced-apart constrictions 144 each engaging an annular web 146 formed in the contact chamber 124. In the embodiment of the invention shown, one constriction 144 is formed by the sleeve-like crimped region 138 of the contact element 126. As a result of the aforementioned construction, the contact elements 126 are very efficiently held in the respective contact chambers 124 and there is also excellent sealing in this region, so that the connector 4 according to the invention is particularly suitable for use in underground working as described.

The aforementioned holding and sealing effect can be improved according to the invention by a slotted clamping ring 148 (see FIG. 9A) which surrounds the substantially cylindrical contact holder 126 at least in the region of one of the constrictions 144 in the contact elements 126 or in the region of the annular webs 146 on the contact chambers 124. The clamping ring 148 is preferably resilient and is disposed in an annular groove 150 of the contact holder 120. In order to fit the contact elements 126 by axially sliding them into the contact chambers 124, chambers 124 can be resiliently radially expanded, e.g. by special pliers, owing to the elastomeric material of which the contact holder 120 is made. After all the contact elements 126 have been fitted, the radial expansion is prevented by the clamping ring 148 provided according to the invention, which is resiliently clipped on after assembly. Owing to its arrangement according to the invention, the clamping ring 148 more particularly ensures that the annular webs 146 are always held in engagement in the constrictions 144 in the contact elements 126.

In FIG. 9, the clamping ring 148, on its side remote from the soldering tabs 130 in the direction of the longitudinal axis 122 of the connector, merges integrally into a positioning cam 152 extending radially outwards. Cam 152 is disposed in a recess 154 in the contact-holder 120 axially adjacent the annular groove 150, and also in an axial slot 156 in one of the securing parts, to be described hereinafter. The positioning cam 152 prevents the contact holder 120 from twisting around its longitudinal axis 122. In addition the positioning cams 152 keep the contact holder 120 in a defined relative rotary position in the respective casing. In order to vary this relative rotary position, according to another feature of the invention, the contact holder 120 has a number of recesses 154 (e.g. three) for the positioning cam 152 of the clamping ring 148, the recesses 154 each being disposed at certain places on the periphery of holder 1290 corresponding to a desired contact position. The rotary or contact position of the connector 4 according to the invention can thus be obtained very easily and rapidly by "re-mounting" (twisting) the clamping ring 148.

As also shown by the section in FIG. 10, the contact holder 120 on the soldering-tab side is connected and has its surface adjacent to a disk-like piece 158, e.g. by adhesion or welding, and the end piece 158 has through openings 160 flush with the contact chambers 124 and only slightly larger in cross-section than the soldering tabs 130. The end piece 158 is secured to the contact holder 120 after all the contact elements 126 have been inserted into the contact chambers 124 in the previously-described manner. The end piece 158 thus helps to secure the contact elements 126, in that it substantially seals the contact chambers 124 up to the through openings 160 from the soldering-tab side. FiGS. 8 and 9 also show a back-up ring 162 which surrounds the contact holder 120 in the region between the positioning cams 152 and the soldering tab-side end of the holder 120 including the clamping ring 148. In the assembled plate, the back-up ring 162 has s front annular surface 166 formed by an outer chamfer 164 and remote rom the soldering tabs 134 and abutting an annular step 168 on the contact-holder 120 bounding one side of the annular groove 150 for the clamping ring 148. The end region of the back-up ring on the tab side has an outer annular web 170. Also, a securing ring 172 is provided with a threaded portion 174 which at one end has an annular web 176 and an inner annular web 178 (shown more particularly in FIG. 11). The securing ring 62 substantially constitutes a screw cap. As shown in FIG. 11, the threaded portion 174 when assembled extends through the opening in the casing wall 42, whereupon the outer annular web 176, via a sealing ring 180, abut the edge of the opening in the casing wall 42, whereas the inner annular web 178 extends over the outer annular web 170 of the back-up ring 162 mounted on the contact-holder 120, and the threaded portion 174 of the securing ring 172 is screwed to the other side of the casing wall 42 by a threaded ring 184 (a threaded nut) preferably disposed in an annular groove 182 in the casing wall 42.

Another securing part is provided, i.e. a securing flange 186 which surrounds and seals the contact holder 120 and screws it against the casing wall 42. The securing flange 186 comprises a flange plate 188 which at one side is adjacent a threaded spigot 190 for connecting a plug (not shown) and at the other side is adjacent a thrust ring 192. In the assembled state, the thrust ring 192 extends through the opening in the casing wall 42 and engages an annular gap formed between the back-up ring 162 and the securing ring 172, up to the outer annular web 170 of the back-up ring 162. In this manner the contact holder 120 is firmly secured in absolutely sealing-tight manner in the casing wall 42. In the process, the axial slot 156 cooperating with the cam 152 for positioning the clamping ring 148 is formed in the thrust ring 192 of the securing flange 186.

As shown in FIG. 9, the contact holder 120 also has an integrally formed sealing ring 194 for sealing against the securing flange 186, and also its front reduced-diameter plug region 196 has an integrally formed sealing ring 198 for sealing against an annular part of a connecting plug (also not shown) and insertable into an annular gap (not shown) formed between the plug region 196 and the threaded spigot 190 of the securing flange 186.

As already explained, the arrangement of the connector parts 78 and 80 on the circuit board 34 is very advantageous as compared with known control devices as will be explained hereinafter.

In the known control devices, the aforementioned connector parts are individually secured to the casing wall, and extend outwardly through openings in the wall. However, each connector part has to be separately sealed from the wall, and the seal is particularly important, particularly when used underground, since for safety reasons moisture and dirt must be prevented from entering the control device. Also each connector part must be connected to the control switching system inside the device, by individual lines which if required are combined into a cable harness. Finally it is also essential for the connector parts to be electrically insulated from the casing, and hitherto the insulation has had to be provided separately for each part. All this greatly increase the complexity of manufacture of known devices, and therefore disadvantageously affects the manufacturing and assembly costs. Also the wiring may be faulty in the internal connections between the connector parts.

According to the invention, as shown especially in FIGS. 3 and 6, the connector parts 70, 80 ar indirectly secured to the casing wall 76 via the circuit board 34, and the circuit board 34 in turn is secured to the casing wall 76 and closed and seals the wall openings 85 from the casing wall 76.

Advantageously the circuit board 34 is secured, e.g by screws 203, to the inside of the rear casing wall 76 with interposition of at least one seal 202. In the embodiment of the invention shown, the connector parts 78, 80 are arranged in two rows parallel to one another and to the top wall 44 of the casing, and the connector parts 78, 80 in each row extend through a common elongate opening 85 in the wall. As shown in FIG. 6, two individual seals 202 can be provided, each surrounding one of the elongate wall openings 85, or alternatively the two seals 202 can be formed in one piece, e.g. via connecting webs (not shown). As another alternative to the embodiment shown, a single seal 202 can be provided and surround all the wall openings 85 in common.

In addition to the aforementioned seal, it may be advantageous, more particularly with regard to underground use of the control device 2 according to the invention, if gaps 104 formed between the connector parts 78, 80 and the wall openings 85 are sealed by a permanently resilient electrically integrating sealing compound 206. Silicon is particularly suitable for this purpose.

In order to secure the connector parts 78, 80 to the circuit board 34 and simultaneously for the purpose of electric connections, the connector parts 78, 80 have parallel soldering tabs which extend in known manner through openings in the circuit board 34 and are soldered to tracks thereon. However, the soldering tabs, openings and tracks are not shown in the drawings.

Advantageously the circuit board 34 is electrically connected to the control circuit board 30 via a ribbon cable 208. Advantageously the ribbon cable 208 is electrically connected via connector parts 210 to the circuit board 34 on the one hand and to the control circuit board 30 on the other hand.

Advantageously the connector parts 78 and 80 are plugs or sockets for connecting the external line connections. Alternatively screw or clamping connectors parts, for example, can be used.

The circuit board 34 provided according to the invention considerably reduces the complexity of the internal wiring, since the actual connection of the parts 78, 80 is via the tracks on the circuit board 34, to which end it is only necessary for the soldering tabs of the connector parts 78, 80 to be inserted in known manner through openings in the track regions and subsequently soldered in common, more particularly in a soldering bath. Since the design of the circuit board 34 is always predetermined as regards the arrangement of the track and soldering openings, errors in wiring or connection are advantageously excluded.

The ribbon cable 208 used for connecting the circuit board 34 inside the device, in conjunction with the connector parts 210, likewise greatly simplifies the connections of the parts 78, 80 inside the device, thus again reliably preventing faulty wiring, since all the connections, i.e. connector parts 210, are already provided as regards the position of their individual connector elements and the arrangement of the respective individual conductors in the ribbon cable 208.

The control device 2 according to the invention is extremely simple to assemble, since it is only necessary to insert the corresponding connector parts securing the circuit plate 34.

The invention also makes it easier to seal the casing in the region of the connecting parts 78 and 80, since it is only necessary to seal the circuit board 34 against the casing wall 76. When the circuit board 34 is sealed against the casing, the control device 2 is already sufficiently sealed. Advantageously also, however, after the circuit board 34 and the connector parts 78 and 80 have been sealed, the gaps 204 between the connector parts 78, 80 and the openings 85 in the casing are sealed by the permanently resilient compound 206.

Since according to the invention the seal 202 disposed between the casing wall 76 and the circuit board 34 is made of electrically insulating plastics, the circuit board 34 after assembly is also electrically insulated from the casing. This however also insulates all the connector parts 78, 80 from the casing, so that this insulation also is greatly simplified by the invention.

The invention is not restricted to the embodiments illustrated and described, but includes all embodiments which are equivalent in the sense of the invention.

We claim:

1. A control means for hydraulic self-advancing support units for underground working, the control means including at least one electrohydraulic control device comprising an electric circuit for energising electromagnets adapted to actuate hydraulic valves, a command keyboard connected to the energising circuit, a display connected to the energising circuit, and two multipole connectors for connecting the control device to respective adjacent devices, the multipole connectors being connected to one another and to the energising circuit by respective electric line connections inside the control device, wherein the energising circuit is substantially made up of a CPU control sub-assembly, a keyboard and display sub-assembly, and a magnet control sub-assembly, these three sub-assemblies being interconnected by a common bus line, and wherein the line connection between the two multipole connectors comprises at least one flexible printed circuit board connected by at least one ribbon cross-connection to one of the three sub-assemblies, the magnet control sub-assembly being connected by electric line connections to the electromagnets, which electromagnets are disposed outside the control device and are incorporated in the hydraulic valves.

2. A control means according to claim 1, wherein each of the three sub-assemblies is formed on a separate circuit board.

3. A control means according to claim 2, wherein the circuit board of the magnet control sub-assembly is secured to a rear wall of a casing of the control device and has connector parts for connecting the line connections leading to the electromagnets as well as connector parts for connecting to limit switches and other lines leading to state sensors, the connector parts extending outwards through one or more wall openings and the casing being sealed in the neighbourhood of the openings.

4. A control means according to claim 3, wherein the circuit board of the magnet control sub-assembly is sealed against the casing wall in the region surrounding the wall opening.

5. A control means according to claim 3, wherein at least one seal surrounding the wall openings and made of electrically-insulating flat plastics material is disposed between the casing wall and the circuit board of the magnet control sub-assembly.

6. A control means according to claim 3, wherein gaps formed between the connector parts and the wall openings are sealed with a sealing compound.

7. A control means according to claim 3, wherein the connector parts have soldering tabs parallel to one another and extending through soldering openings in the circuit board, the tabs being soldered to tracks on the circuit board.

8. A control means according to claim 3, wherein the circuit board of the magnet control sub-assembly is electrically connected to the CPU control sub-assembly by a ribbon cable.

9. A control device according to claim 8, wherein the ribbon cable is electrically connected by multipole connector parts to the circuit board of the magnet control sub-assembly on the one hand and to the CPU control sub-assembly on the other hand.

10. A control means according to claim 1, wherein the CPU control sub-assembly comprises a single-chip microprocessor.

11. A control means according to claim 1, wherein the CPU control sub-assembly comprises a data transmission component and at least one data store.

12. A control means according to claim 1, wherein the CPU control sub-assembly comprises a data transmission component and a device-protecting voltage-regulating circuit.

13. A control means according to claim 1, wherein the kayboard and display sub-assembly carries a command keyboard which comprises command keys and LED indicator lamps disposed therein.

14. A control means according to claim 1, wherein the magnet control sub-assembly comprises a circuit for energising and lowering the electromagnets.

15. A control means according to claim 1, wherein the magnet control sub-assembly comprises a limit switch and a sensor-interrogating circuit.

16. A control means according to claim 1, wherein the CPU control sub-assembly and the keyboard and display sub-assembly are secured to a front plate which constitutes a lid of the casing of the control device.

17. A control means according to claim 16, wherein a display in the form of an optical-character LCD display and connected to the CPU control sub-assembly is disposed on the front plate of the control device together with a holding key comprising a circuit board connected to the CPU control sub-assembly via a ribbon cable provided with multipole connectors.

18. A control means according to claim 16, wherein the front plate is sealed by a seal against the casing, the seal being made of a sealing compound and being a profile seal disposed in sealing engagement against the inner surface of the casing and in a peripheral groove of a cover attachment inserted with slight clearance into a front opening in the casing.

19. A control means according to claim 16, wherein an additional sub-assembly for certain additional functions including parameterisation, connecting to the mains and remote charging is connected by multipole connectors to the CPU control sub-assembly and is formed on an additional circuit board secured to the front plate.

20. A control means according to claim 1, wherein the connector parts are in the form of plugs or sockets for plugging in outer line connections.

21. A control means according to claim 1, wherein the line connection connecting the multipole connectors comprises a number of parallel flexible circuit boards in the form of strips.

22. A control means according to claim 21, wherein at least one of the flexible circuit boards has a number of tracks, and the other flexible board, or each other flexible board, has two conductive layers for transmitting voltage, the flexible circuit boards being conductively connected in the region of certain tracks or conductive layers via soldering tags on the multipole connectors which extend through openings in all the circuit boards in common and are soldered to each flexible circuit board.

23. A control means according to claim 21, wherein the multipole connectors are disposed in a respective one of two facing side walls of the casing, the flexible circuit boards extending along the side walls and an upper wall of the casing.

24. A control means according to claim 1, wherein the bus line connecting the sub-assemblies comprises ribbon cables respectively connected to the sub-assemblies.

25. A control means according to claim 1, wherein the ribbon cross-connection comprises a ribbon cable connected at one end via a self-contacting multipole connector to the CPU control sub-assembly and at the other end via a self-conducting plug to the flexible circuit board or boards in the region between the multipole connectors.

26. A control means according to claim 1, wherein each multipole connector comprises a contact holder secured by securing parts in a sealing-tight manner in a wall opening and having a number of contact chambers extending parallel to one another through the contact holder in the direction of the longitudinal axis of the multipole connector, each contact chamber containing contact elements having connecting pieces which project to the exterior from one side of the contact holder.

27. A control means according to claim 26, wherein the connecting pieces of the contact elements comprise parallel soldering tabs.

28. A control means according to claim 27, wherein the soldering tabs project for varying lengths from the contact holder.

29. A control means according to claim 27, wherein the free ends of the soldering tabs end approximately on a plane disposed at an angle to the longitudinal axis of the multipole connector.

30. A control means according to claim 27, wherein the soldering tabs comprise wires crimped to the contact elements.

31. A control means according to claim 27, wherein the contact elements are peripherally sealed against the contact holder and are positively held in the contact chambers.

32. A control means according to claim 27, wherein the contact holder is made of a resilient material while the contact elements each have at least one constriction for engaging an annular web formed in the contact chamber.

33. A control means according to claim 32, wherein a slotted clamping ring is disposed in an annular groove in the contact holder and surrounds the contact holder in the region of the constrictions in the contact elements.

34. A control means according to claim 33, wherein the back-up ring surrounds the contact holder in the region of the soldering-tab end of the holder including the clamping ring and, when in the assembled state, has a front annular surface remote from the soldering tabs and abutting an annular step of the contact-holder bounding one side of the annular groove for the clamping, the back-up ring having an outer annular web in the region on the side of the soldering tab.

35. A control means according to claim 27, wherein the contact holder on the side of the soldering tabs is connected to and in contact with the surface of a disk-shaped end member, the end member having lead-through openings in line with the contact chambers and having a cross-section slightly greater than that of the soldering tabs.

36. A control means according to claim 26, wherein the contact holder has an integrally-formed sealing ring for sealing against a securing flange, while a front reduced-diameter plug region of the contact holder has an integrally-formed sealing ring for sealing against a connecting plug.

* * * * *